United States Patent [19]

Cameron et al.

[11] Patent Number: 4,495,161
[45] Date of Patent: Jan. 22, 1985

[54] ENERGY RECOVERY METHOD AND SYSTEM FOR COMBINED SULPHURIC ACID AND PHOSPHORIC ACID MANUFACTURING PLANT

[75] Inventors: Gordon M. Cameron, Willowdale; John V. Orlando, Scarborough, both of Canada

[73] Assignee: C-I-L Inc., North York, Canada

[21] Appl. No.: 599,606

[22] Filed: Apr. 16, 1984

Related U.S. Application Data

[63] Continuation of Ser. No. 473,188, Feb. 22, 1983, abandoned, which is a continuation of Ser. No. 307,088, Sep. 30, 1981, abandoned.

[30] Foreign Application Priority Data

Apr. 10, 1981 [CA] Canada .................................. 375178

[51] Int. Cl.³ ...................... C01B 25/16; C01B 17/98; C01B 17/48
[52] U.S. Cl. .................................... 423/167; 423/320; 423/522; 423/533; 422/161; 159/17 R; 159/47.1; 203/12
[58] Field of Search .................. 423/522, 525, 1, 528, 423/531, 533, 320, 321 R, 167; 422/160, 161; 157/47 R, 17 R; 203/12, 35

[56] References Cited

U.S. PATENT DOCUMENTS

| | | | |
|---|---|---|---|
| 3,511,599 | 5/1970 | Suriani | 423/525 |
| 4,123,107 | 10/1978 | Bryant, Jr. et al. | 423/522 |
| 4,276,116 | 6/1981 | Blumrich et al. | 423/531 |
| 4,312,842 | 1/1982 | Wilson, Sr. | 423/541 R |
| 4,330,364 | 5/1982 | Blumrich et al. | 423/531 |

FOREIGN PATENT DOCUMENTS

| | | | |
|---|---|---|---|
| 2529709 | 1/1977 | Fed. Rep. of Germany | 423/522 |
| 2529708 | 1/1977 | Fed. Rep. of Germany | 423/522 |
| 2700009 | 7/1978 | Fed. Rep. of Germany | 423/522 |
| 1553307 | 9/1979 | United Kingdom | 423/522 |
| 1589945 | 5/1981 | United Kingdom | 423/522 |

OTHER PUBLICATIONS

Olsen, John C., Unit Processes and Principles of Chemical Engineering, D Van Nostrand Co. Inc., New York, N.Y, 1932, pp. 1-3.
CPI Firms Map Strategy for Energy-Saving Plans Chemical Engineering, Nov. 7, 1977, pp. 49-51.
Sander et al., Waste Heat Recovery In Sulfuric Acid Plants CEP, Mar. 77, pp. 61-64.
Sander et al., Concentration of Dilute Sulfuric Acid and Phosphoric Acid with Waste Heat, Proceedings of British Sulfur Corp. 5th International Conf. Part II, London, Nov. 16-18, 1981, pp. 440-458.

Primary Examiner—Gary P. Straub
Attorney, Agent, or Firm—Rogers, Bereskin & Parr

[57] ABSTRACT

In conventional processes for manufacturing phosphoric acid, sulphuric acid is reacted with phosphate rock to produce weak phosphoric acid which is concentrated using steam from the associated sulphuric acid manufacturing operation. Low grade heat from the absorbers and drier of the sulphuric acid manufacturing plant has been wasted. According to the invention waste heat from the drier and one or more absorbers of the sulphuric acid manufacturing plant is used in all the evaporators of the phosphoric acid plant. The evaporators all operate at low pressures and their heaters are arranged in series, to enable the heat to be used at the relatively low temperatures available. The valuable steam is thus freed for other uses.

11 Claims, 7 Drawing Figures

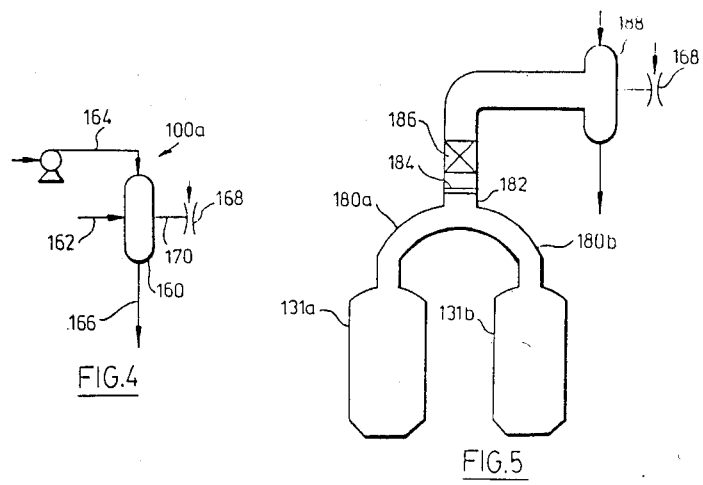
FIG.4
FIG.5
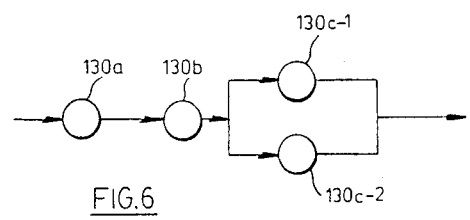
FIG.6
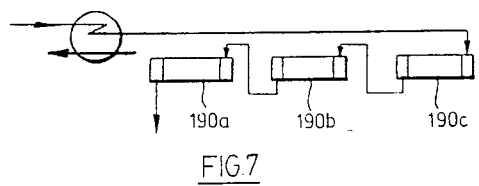
FIG.7

4,495,161

ENERGY RECOVERY METHOD AND SYSTEM FOR COMBINED SULPHURIC ACID AND PHOSPHORIC ACID MANUFACTURING PLANT

This is a continuation of application Ser. No. 473,188, filed 02/22/83, now abandoned, which was a continuation of application Ser. No. 307,088 filed 09/30/81 now abandoned.

This invention relates to the wet process manufacture of phosphoric acid utilizing sulphuric acid and phosphate rock.

Phosphoric acid is normally manufactured by reaction of phosphate rock (a compound consisting primarily of calcium phosphate) with sulphuric acid to form a mixture of phosphoric acid, which remains in solution, and calcium sulphate which is normally present as a hydrated crystal, either as calcium sulphate di-hydrated (gypsum) or as calcium sulphate hemi-hydrate. The nature of the crystal formed is critical to the process and the processes are thus classified as either di-hydrate or hemi-hydrate, depending on the nature of the crystal produced. In some cases both forms of crystal may be produced in different stages in which case the process may be referred to as a hybrid process. In any of these processes, the phosphoric acid plant may be associated with a sulphuric acid manufacturing plant, which produces the sulphuric acid needed to manufacture the phosphoric acid.

In the past most manufacturers of phosphoric acid have used the di-hydrate process, which produces a grade of phosphoric acid of concentration between 27% and 32% $P_2O_5$ and which also contains a large quantity of solids which must be removed in a filter. After filtering the acid is heated and water is evaporated under vacuum to produce a grade of acid of concentration typically between 50% and 55% $P_2O_5$, which represents the normal product grade. To carry out the concentration step, a large amount of steam is required, commonly about 1.3 pounds per pound of water actually evaporated. The quantity of steam so required is typically about ⅔ of that produced in the associated sulphuric acid plant. Additional steam may also be required to operate ejectors to remove the inert gases present. The additional steam along with that used in the evaporation stage normally consumes most of the available steam from the sulphuric acid operation.

By comparison hemi-hydrate processes require higher temperatures in the reaction step and produce stronger phosphoric acid (of concentration between 35% and 45% $P_2O_5$). The more concentrated acid requires less evaporation, typically less than half of that required for the di-hydrate process, therefore leaving much of the available steam from the sulphuric acid plant free for other uses. Such energy is valuable, and it has been suggested that the phosphoric acid industry will have to shift to the hemi-hydrate process on the basis of this energy saving.

However the hemi-hydrate process has several disadvantages. Firstly, the higher temperatures used in the hemi-hydrate process result in more corrosion caused by the higher temperatures in the reaction and filtering steps. The increased corrosion means that more expensive maintenance is required. In addition, the hemi-hydrate crystal is usually smaller than the di-hydrate crystal and therefore tends to clog the filters more rapidly than the di-hydrate crystal. Therefore larger and more costly filters are required, or alternatively the plant must be shut down more frequently for cleaning, resulting in less time on-stream. Finally, the recovery efficiency for the hemi-hydrate process is lower than that for the di-hydrate process, i.e. it will recover less phosphoric acid from the same grade of phosphate rock.

It is also noted that a common by-product of phosphoric acid plants is uranium which is extracted from the phosphoric acid. A further disadvantage of the hemi-hydrate process is that it is more difficult to extract uranium from the high concentration acid produced by the hemi-hydrate process than from the weaker acid produced by the di-hydrate process.

It is therefore an object of this invention to provide an integrated process for the manufacture of sulphuric acid and phosphoric acid according to the di-hydrate process, in which low grade waste heat from the associated sulphuric acid manufacturing process which has normally been rejected is used in the concentration of the phosphoric acid, thereby freeing much of the high grade energy from the sulphuric acid manufacturing process which was normally used for this purpose.

In one aspect the invention provides, in a process for the manufacture of concentrated phosphoric acid in which sulphuric acid and phosphate rock are reacted to produce a slurry of calcium sulphate in dilute phosphoric acid, the slurry being filtered to produce a dilute stream of phosphoric acid and the phosphoric acid then being concentrated by evaporation of excess water in at least first and second evaporator stages, and in which said sulphuric acid is produced in a sulphuric acid plant physically adjacent the phosphoric acid plant, said sulphuric acid plant having means for producing a stream of gas containing oxygen, means for reacting said stream of gas to produce sulphur dioxide therein, a converter to convert said sulphur dioxide to sulphur trioxide, drying means for absorbing, in a first portion of sulphuric acid, moisture from said gas stream upstream of said converter, absorbing means for absorbing, in a second portion of sulphuric acid, sulphur trioxide from said converter, cooling means for cooling at least said second sulphuric acid portion, and means for producing high quality steam, the improvement comprising the steps of recovering in a heat recovery fluid heat from said cooling means, using said heat to evaporate water from the phosphoric acid in said first and second evaporator stages, and operating each of said first and second evaporator stages at low pressure and in series by a barometric condenser to enable said evaporation, thereby allowing said steam to be used for other purposes.

The teachings of the invention may also be applied by using the heat recovery fluid only in the first evaporation stage, but this is much less desirable, as will be explained.

Further objects and aspects of the invention will appear from the following description, taken together with the accompanying drawings in which:

FIG. 4 is a schematic view of a typical barometric condenser;

FIG. 5 is a schematic showing an arrangement of vacuum inducing elements in common;

FIG. 6 is a schematic showing a series-parallel arrangement of evaporators; and

FIG. 7 is a schematic showing preheating of feed to evaporator vessels.

Figure 1:
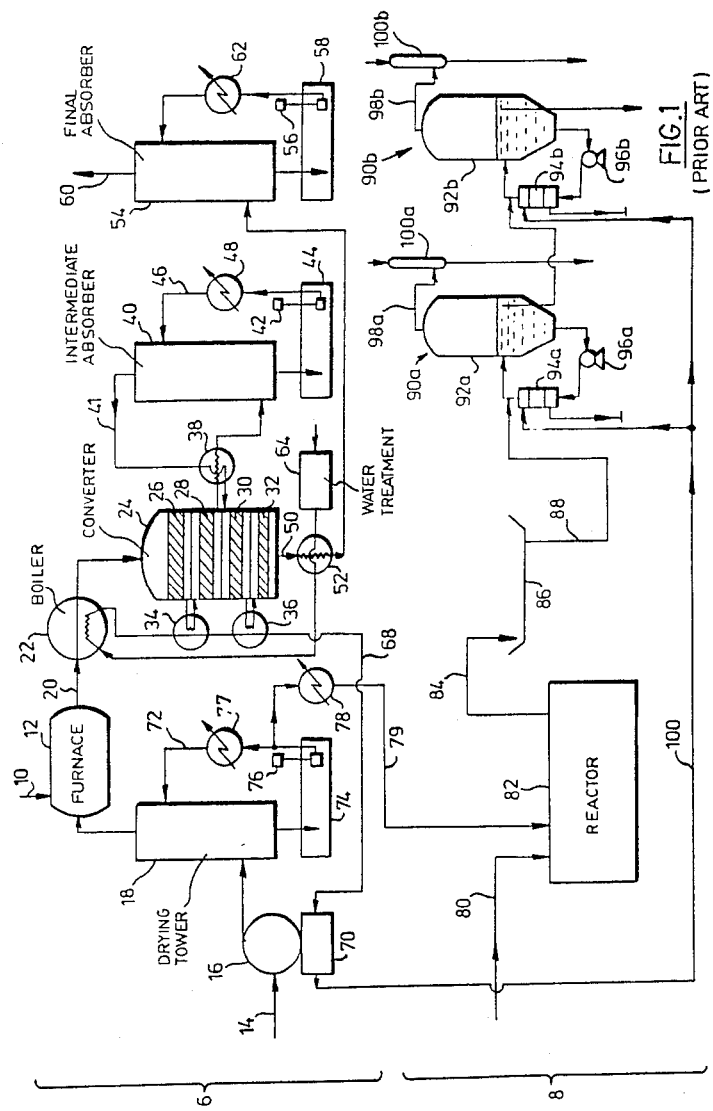
FIG. 1 is a flow sheet showing a typical prior art integrated sulphuric acid plant and phosphoric acid plant.

Reference is first made to FIG. 1, which shows a typical prior art sulphuric acid plant 6 and phosphoric acid plant 8. It is common to find both plants on the same site.

The processes for manufacturing sulphuric acid and phosphoric acid are well-known and therefore a typical process will be described only briefly. As shown, in the sulphuric acid plant 6 a sulphur stream 10 is pumped in liquid form to a furnace 12 into which it is sprayed. An air stream 14 is compressed by a blower 16, dried in drying tower 18, and then used to burn the sulphur in furnace 12. The resultant sulphur burner gas stream 20, which contains sulphur dioxide, has much of its heat removed in a waste heat boiler 22 for the generation of high quality high pressure steam. The sulphur dioxide gas stream 20 is then directed to a converter 24 having four catalyst beds 26, 28, 30, 32. Cooling of the gas stream is required after each catalyst bed, since substantial amounts of heat are generated in the catalyst beds. Therefore heat exchangers 34, 36 are provided between beds 26 and 28 and between beds 30 and 32. In addition, when the gas leaves the second bed 28, it passes through another heat exchanger 38 where it is cooled, and it then passes to an intermediate absorber 40. In the absorber 40 sulphur trioxide is absorbed in a countercurrent stream of sulphuric acid which is pumped by pump 42 from a pump tank 44 through duct 46 to the top of the absorber. Acid from the bottom of the absorber 40 is returned to the pump tank 44. The circulating absorber acid is cooled by cooler 48.

The gas stream 41 containing the unconverted $SO_2$ from the intermediate absorber 40 passes through the heat exchanger 38 where it is partly reheated and then enters the third bed 30 of the converter 24. The gas from bed 30 passes to the fourth bed 32, and then leaves the converter as gas stream 50.

Gas stream 50 is cooled in a further heat exchanger 52 and then enters the final absorber 54. In absorber 54 the sulphur trioxide is absorbed in sulphuric acid pumped by pump 56 from tank 58, the gas stream then being released at 60 to atmosphere. The circulating acid from tank 58 is cooled by cooler 62.

The high grade steam system is an important component of the plant. In this system boiler feed water is treated at 64 to demineralize the water, is preheated in heat exchanger 52, and is then directed to the boiler 22 to generate saturated steam 66. The steam 66 is then directed through heat exchangers 34 and 36, which function as superheaters, to produce high pressure superheated steam 68 (typically at 600 pounds pressure). The high pressure steam 68 is typically passed through a back pressure turbine 70, which drives blower 16 and which has a low exhaust steam pressure, typically about 50 psig. The exhaust steam is used in the evaporators of the associated phosphoric acid plant 8, as will be described.

The heat from the absorber coolers 48, 62 is low grade heat which is transferred to cooling water. The cooling water is then sent to cooling towers or other suitable location where the heat is rejected to atmosphere. In addition, drying in the dry tower 18 is effected by a stream of sulphuric acid 72 pumped from pump tank 74 by pump 76. The drying acid is cooled by cooler 77 utilizing cooling water which is then also directed to a cooling tower or heat sink. The acid in tank 74, which serves as product acid, is further cooled by product acid cooler 78 (the heat from which is also wasted) before being directed as stream 79 to the phosphoric acid plant 8. (The standard connections between acid tanks 44, 58 and 74 are not shown.)

In the di-hydrate phosphoric acid plant 8, crushed phosphate rock 80 is fed to an agitated reactor vessel 82, where it is dissolved in sulphuric acid supplied by the product sulphuric acid stream 79. The reaction yields a slurry containing phosphoric acid and calcium sulphate together with various impurities. A slurry stream 84 is pumped onto a filter 86 where the calcium sulphate is separated from the phosphoric acid. The resultant phosphoric acid stream 88, typically at a concentration of between 27% and 32% $P_2O_5$, is then concentrated in evaporator stages 90a, 90b to produce product phosphoric acid, the concentration of which is normally between 50% and 60% $P_2O_5$, typically 54% $P_2O_5$. Although the evaporator stages are shown in series for convenience of the following description, they are very commonly arranged in parallel.

Each evaporator stage 90a, 90b typically includes a separator vessel 92a, 92b and a heater 94a, 94b. Phosphoric acid is withdrawn from the bottom of each vessel, pumped by pump 96a, 96b through heaters 94a, 94b, and then returned to the vessel 92a, 92b at about the level of the top of the liquid in the vessel. The heat for the heaters 94a, 94b is normally provided by the high grade steam from the exhaust of the turbine 70, via conduit 100. When the heated phosphoric acid re-enters the evaporator vessels 92a, 92b, which are under vacuum, the water vapor flashes off. The overhead water vapor streams 98a, 98b from the vessels of the evaporator 90a, 90b are removed using water flushed barometer condensers 100a, 100b. The condensed steam from heaters 94a, 94b is wasted or used as boiler feed water. The evaporator heaters, which are shown in parallel, are typically operated at temperatures set by the temperature limits of their linings and at maximum pressure to increase throughput in the plant.

In summary at this point, it may be noted that heat is always released in the manufacture of sulphuric acid whether by sulphur burning or from metallurgical gas. About 60% of the available heat or energy released in the case of sulphur burning plant is captured in the form of high pressure steam 68. The high pressure steam 68 is normally used to drive the air blower 16 and other machinery in the sulphuric acid plant 6, and after expansion is used in the evaporators of the phosphoric acid plant 8. The phosphoric acid plant 8 normally consumes most of the excess usable energy in the steam available from the sulphuric acid plant 6. The remaining 40% of the energy from the sulphuric acid plant is of low grade, contained in sulphuric acid streams between temperatures of 160° F. and 240° F. (usually between 180°–230° F.), and has traditionally been rejected through cooling water to atmosphere.

The inventors have noted that the quantity of low grade waste energy produced in a sulphuric acid plant, and which was previously rejected to the atmosphere, is approximately of the same size as the quantity of heat required in the evaporators of a di-hydrate process phosphoric acid plant matched in size to the sulphuric acid plant. The sulphuric acid plant is matched to the phosphoric acid plant when the former produces the required quantity of sulphuric acid for the latter. Normally between 2.7 and 2.8 pounds of sulphuric acid are required to make a pound of phosphoric acid expressed as $P_2O_5$. The exact ratio depends on the quality of the phosphate rock used, and in some cases if the rock is of poor quality more sulphuric acid may be needed, up to about 2.9 pounds.

A possibility therefore exists of integrating the sulphuric acid and phosphoric acid operations based on utilization of the sulphuric acid plant waste heat. Such utilization would free much of the high grade energy released from the sulphuric acid operation for use as heat or for power generation. This would allow the proven and reliable di-hydrate process to be continued to be used in sites where both acids are manufactured, without the penalty in energy now associated with the di-hydrate process as compared with the hemi-hydrate process. It would also allow phosphoric acid manufacture at non sulphur sites without the energy penalty now present.

In a normal phosphoric acid plant, the linings of the separator vessels 92a, 92b allows operating temperatures up to about 190° F., and normally all stages are set to operate at this limiting temperature by regulating the pressures in the vessels. Units may be in series or parallel. This operating mode maximizes the density of the water vapor produced and thus the capacity of the evaporator bodies. Typically the steam used in the heaters 94a, 94b of the evaporators ranges from slightly below atmospheric pressure to as high as five atmospheres (50 psig in the example given), the higher pressures being used to minimize the capital investment in heat transfer equipment.

The waste heat from the sulphuric acid plant, available from coolers 48, 62 and 77, is at a temperature range between 180° and 230° F. and is therefore not particularly useful for evaporating water at 190° F. It is necessary therefore to consider the various means by which the source of heat and the proposed heat sink can be brought into balance. Such consideration is best directed first at the sulphuric acid plant 6 and then at the phosphoric acid plant 8.

With regard to the sulphuric acid plant 6, theoretically the acid cooling operations can be carried out at a higher temperature level. In such a case increased corrosion, increased carry-over of acid vapor and decreased reliability can be expected. The shift is therefore possible but only at the expense of plant performance and is undesirable. An indirect means of raising the level of the available energy from the acid cooling also exists, such as heat pumps or thermo-compression systems. However apart from the energy consumption of the upgrading systems, which can be as high as 30% of the amount of energy being transferred, the capital cost of such equipment is also high, making the upgrading of the energy undesirable.

In the phosphoric acid plant evaporators, water vapor is currently removed from the phosphoric acid at a variety of absolute pressures typically ranging from three inches of mercury in the last stage evaporator, to eight inches of mercury in the first stage where the evaporators are in series (all mercury pressures are absolute).

As previously stated, the evaporator stages in the phosphoric acid can be arranged either in parallel or in series. For parallel operation, the entering filtered acid enters a circulating stream of phosphoric acid of concentration between 50% and 60%. Vacuum is maintained by using a large flow of water in a barometric condenser to develop a pressure of about three inches of mercury, which corresponds to a boiling temperature in the evaporator stage of about 190° F. This temperature is too high for acid plant waste heat. Lower pressures, in the range of 1.5 inches of mercury or less, can be obtained if needed using steam jet ejectors, but the amount of steam required in the ejectors will normally be equivalent to or greater than that required for evaporation, thus destroying the object of the exercise. Parallel operation of evaporator stages is therefore impractical for waste energy utilization.

In series operation of the evaporation stages, the various stages will operate at different acid strength, and data on vapor pressure over phosphoric acid indicates that at the lowest practical operating pressure set by the barometric condensers, operating temperatures can be reduced substantially. Table I shows the boiling temperature for various phosphoric acid solutions at a pressure of three inches of mercury. Three inches of mercury absolute pressure has been taken as it can be achieved without resort to exotic measures.

TABLE I

| Concentration of Phosphoric Acid (%) | Temperature (Degrees Farenheit) |
|---|---|
| 25 | 126.5 |
| 30 | 130 |
| 35 | 134.6 |
| 40 | 141.2 |
| 45 | 153 |
| 50 | 173 |
| 54 | 200 |

Table I indicates that the temperature at which water can be boiled off phosphoric acid is drastically reduced for low concentration acid. For a two stage evaporation process, for example, the first stage may typically operate at a phosphoric acid concentration of around 37% $P_2O_5$, corresponding to a boiling point of 141° F., which is below the temperature of the waste heat sources in the sulphuric acid plant (180° to 230° F.). Disadvantages of use of such a low pressure level which have in the past caused it to be avoided include (a) greater circulation of water in the barometric condenser (which may require for example substantial additional horsepower for pummping, as will be explained), and (b) use of a larger separator vessel due to the lower density of the water vapor at the lower pressure.

However despite these disavantages, the advantage of operating a series evaporator system at low vacuum can be seen when one considers the removal of water from a phosphoric acid solution. If one assumes a phosphoric acid stream of 28% $P_2O_5$ concentration as a typical feed to the concentration section, and a 54% $P_2O_5$ concentration product, the water removed per unit of phosphoric acid is shown in Table II:

TABLE II

| % Phosphoric Acid as $P_2O_5$ | Present Pounds $H_2O$ Per Pound of Phosphoric Acid as $P_2O_5$ | Removed Pounds $H_2O$ Per Pound Phosphoric Acid as $P_2O_5$ | % Removal |
|---|---|---|---|
| 28 | 2.5714 | 0.0000 | 0 |
| 30 | 2.3333 | 0.2381 | 13.846 |
| 35 | 1.8571 | 0.7143 | 41.539 |
| 40 | 1.5000 | 1.0714 | 62.305 |
| 45 | 1.2222 | 1.3492 | 78.4601 |

TABLE II-continued

| % Phosphoric Acid as $P_2O_5$ | Present Pounds $H_2O$ Per Pound of Phosphoric Acid as $P_2O_5$ | Removed Pounds $H_2O$ Per Pound Phosphoric Acid as $P_2O_5$ | % Removal |
|---|---|---|---|
| 50 | 1.0000 | 1.5714 | 91.382 |
| 54 | 0.8519 | 1.7196 | 100 |

The last column in Table II above indicates the percentage of water removal, assuming that the total water removed to concentrate the acid from 28% to 54% $P_2O_5$ is 100%.

Table II above demonstrates the effective distribution of heat loads. For example, if two series evaporator stages are used to concentrate the acid from 28% to 54% $P_2O_5$ concentration phosphoric acid, with equal water removal in each stage, the phosphoric acid concentration in the two stages will be 37% and 54% $P_2O_5$, corresponding to phosphoric acid boiling points of 137° F. and 200° F. respectively at 3" Hg. (Table I). It will be seen that half of the heat required will be transferred at a temperature of 137° F. and the other half at 200° F., while the heat itself is available in the sulphuric acid streams between typically 180° F. and 230° F. With a series arrangement of evaporators and a series utilization of the waste heat from the sulphuric acid cooling systems, it is therefore now possible to transfer the waste acid system heat to the phosphoric acid evaporators. More stages in series will provide an even better lowering of the temperature at which the heat load is utilized.

With regard to the mechanism by which heat is transferred from the sulphuric acid plant to the phosphoric acid evaporator sections, it will be noted that (a) the classic heat transfer equipment in the sulphuric acid plant (either cast iron or stainless steel) is unlikely to be acceptable in phosphoric acid solution, due to both corrosion and the high degree of fouling, and (b) the classic graphite equipment used in the phosphoric acid evaporation process will not survive in contact with a concentrated sulphuric acid solution. An intermediate fluid is therefore required which can be used with both materials. The intermediate fluid must have adequate heat carrying capacity as well as good thermal characteristics. A typical fluid is treated water, preferably demineralized and deaerated, but other fluids can be used such as anti-freeze solutions. Heating of this fluid in the sulphuric acid plant will preferably be countercurrent to the acid streams involved, since the inlet fluid must be colder than the sulphuric acid leaving the heat transfer device and must be hotter than the last stage in the phosphoric acid evaporators. In addition series or essentially series (as will be discussed) use is required in the phosphoric acid plant, since the heat required for the last stage of phosphoric acid evaporation cannot come from the lowest grade heat recovered from the sulphuric acid operation.

Specific examples to illustrate the invention will now be described. In the following examples, a 2,000 short ton per day (STPD) sulphuric acid plant will be considered, integrated with a 700 STPD phosphoric acid plant.

A 2,000 STPD sulphuric plant normally produces approximately $204 \times 10^6$ BTU per hour of heat which is used in steam production and an additional $170 \times 10^6$ BTU per hour of low grade heat which is wasted.

The low grade heat in a 2,000 STPD sulphuric acid plant 6 as shown in FIG. 1 is typically distributed as shown in Table III:

TABLE III

| Cooler | Acid Temperature (in) °F. | Acid Temperature (out) °F. | Heat Removed ($10^6$ BTU Per Hr.) |
|---|---|---|---|
| Dry Tower Cooler 77 | 235 | 175 | 45.0 |
| Intermediate Absorber Cooler 48 | 235 | 175 | 94.5 |
| Final Absorber Cooler 62 | 216 | 180 | 25.0 |
| Product Acid Cooler 78 | 175 | 100 | 4.9 |
| Stack 60 | | | 8.0 |

The operating characteristics of the typical two stage phosphoric acid concentration plant 8 shown in FIG. 1, assuming a 700 STPD capacity, are shown in Table IV:

TABLE IV

| | Evaporator Stage 90a | Evaporator Stage 90b |
|---|---|---|
| Feed Strength (% phosphoric acid as $P_2O_5$) | 28% | 40% |
| Feed rate, lb/hr | 209,200 | 146,600 |
| Discharge, lb/hr | 146,600 | 108,200 |
| Water evaporated, lb/hr | 62,600 | 38,300 |
| Steam pressure, psia | 27.5 | 27.5 |
| Steam temp., °F. | 245 | 245 |
| Liquid temp., °F. | 175 | 190 |
| Vapour pressure, in. Hg. abs. | 6.5 | 2.5 |
| Steam rate, lb/hr | 78,900 | 48,300 |
| Barometric condenser water at 92° F. USGPM | 3,040 | 5,980 |

EXAMPLE 1

It will be seen from Table IV that the evaporator heaters 94a and 94b of the phosphoric acid plant together require 127,200 pounds per hour of steam, i.e., they have a heat load requirement of about 120,000,000 BTU per hour. In a 2,000 STPD sulphuric acid plant the intermediate absorber cooler 48 and the dry tower cooler 77 together remove about 140,000,000 BTU per hour. These coolers can therefore supply the necessary heat for the evaporator heaters 94a, 94b.

Figure 2:
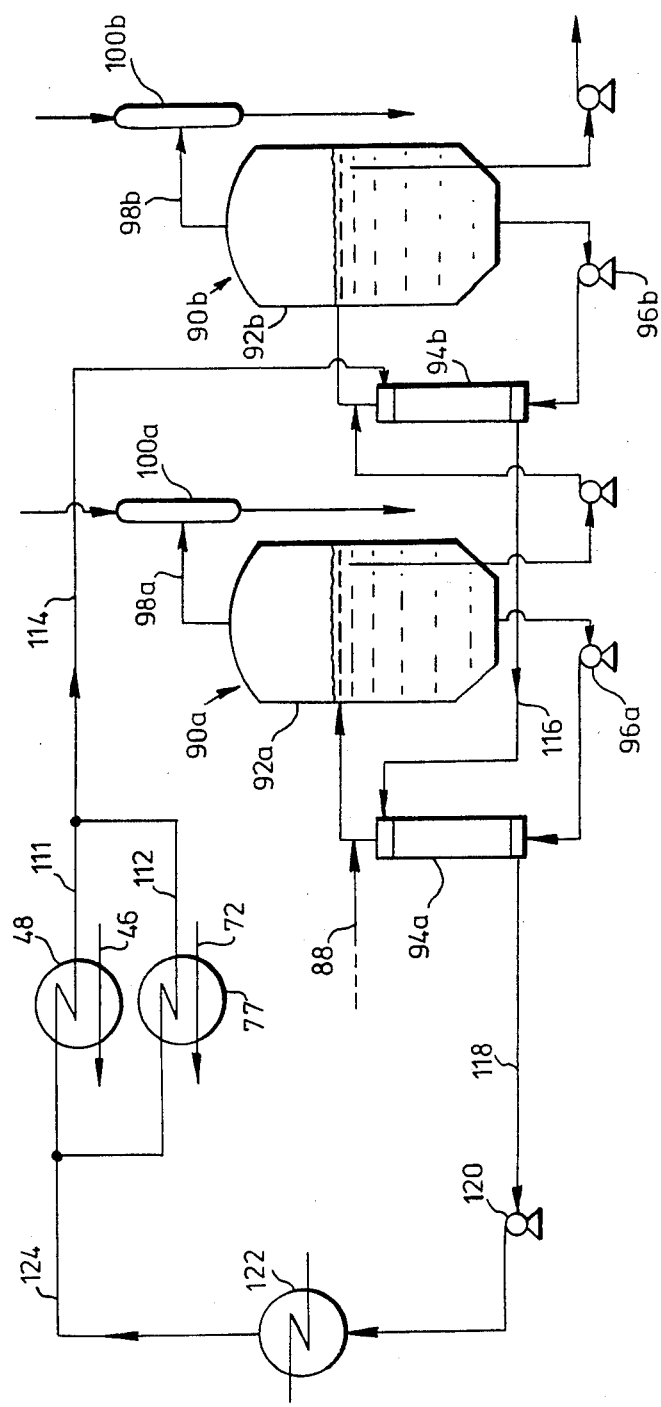
FIG. 2 is a flow sheet showing a method according to the invention for recovering waste heat from the sulphuric acid plant for use in the concentration system of the phosphoric acid plant.

Reference is now made to FIG. 2, which shows a design which uses water from the intermediate absorber cooler 48 and dry tower cooler 77 in place of steam to concentrate the phosphoric acid from 28% to 37% $P_2O_5$ in the first stage evaporator 90a, and from 37% to 54% $P_2O_5$ in the second stage evaporator 90b. In the FIG. 2 circuit, demineralized and deaerated water streams are passed through the intermediate absorber cooler 48 and dry tower cooler 77, each countercurrent to the acid streams 46, 72 therein, and leave the cooler 48 as two streams 111 and 112, each at approximately 220° F. The two streams are joined as stream 114. Water stream 114 enters the second stage evaporator heater 94b first, since the temperature must be hottest in evaporator 90b. The water stream, now indicated at 116, leaves heater 94b at 195° F. after having given up heat to the circulating phosphoric acid therein. The water stream 116 at 195° F. next enters the first evaporator heater 94a and leaves that heater at the lower temperature of 170° F., as stream 118. Stream 118 is then pumped by pump 120 through a trim cooler 122 which removes heat to reduce the temperature to 160° F. The stream 124 from the trim cooler is then returned to the inlets of coolers 48 and 77.

The operating conditions of the first evaporator stage 90a are changed from normal. When the evaporator heater 94a used steam as its heat source, the conventional operating conditions were a liquid temperature of 178° F. and a pressure of 6.5 inches of mercury absolute. For the evaporator heater 94a to use hot water as its heat source, the evaporator 90a operating temperature is lowered to between 2.5 and 3.0 inches of mercury absolute. At this pressure the boiling temperature of 37% concentration phosphoric acid drops to between 135° and 140° F. This improves the heater thermal performance sufficiently to enable the use of a heat source with the colder temperature of the water in stream 114.

Table V below summarizes the operating conditions for two stage evaporation in a 700 STPD phosphoric acid plant concentrating from 28% to 54% using the hot water loop in the evaporators 90a, 90b. Note that lowering the evaporator 90a operating pressure increases the barometric condenser water flow from 3040 U.S. gallons per minute to 6738 U.S. gallons per minute.

TABLE V

|  | Evaporator Stage 90a | Evaporator Stage 90b |
|---|---|---|
| Feed strength (% phosphoric acid as $P_2O_5$) | 28% | 37% |
| Feed rate, lb/hr | 209,200 | 158,750 |
| Discharge rate, lb/hr | 158,750 | 108,200 |
| Water evaporated, lb/hr | 50,450 | 50,450 |
| Water In temp. | 195° F. | 220° F. |
| Water Out temp. | 170° F. | 195° F. |
| Liquid temp. ($H_3PO_4$) | 138° F. | 185° F. |
| Vapour pressure, in. Hg. abs. | 3.0 | 2.5 |
| Barometric condenser water at 92° F. USGPM | 7900 | 7900 |

The steam requirement for evaporation in the two stage operation of the 700 STPD phosphoric acid plant is now eliminated. This is a reduction in steam consumption of 1.26 pounds per pound of water evaporated or 127,200 pounds per hour of steam. This steam is now available for other profitable uses.

EXAMPLE 2

Again this example uses a 2,000 STPD sulphuric acid plant and a 700 STPD phosphoric acid plant as a basis.

Figure 3:
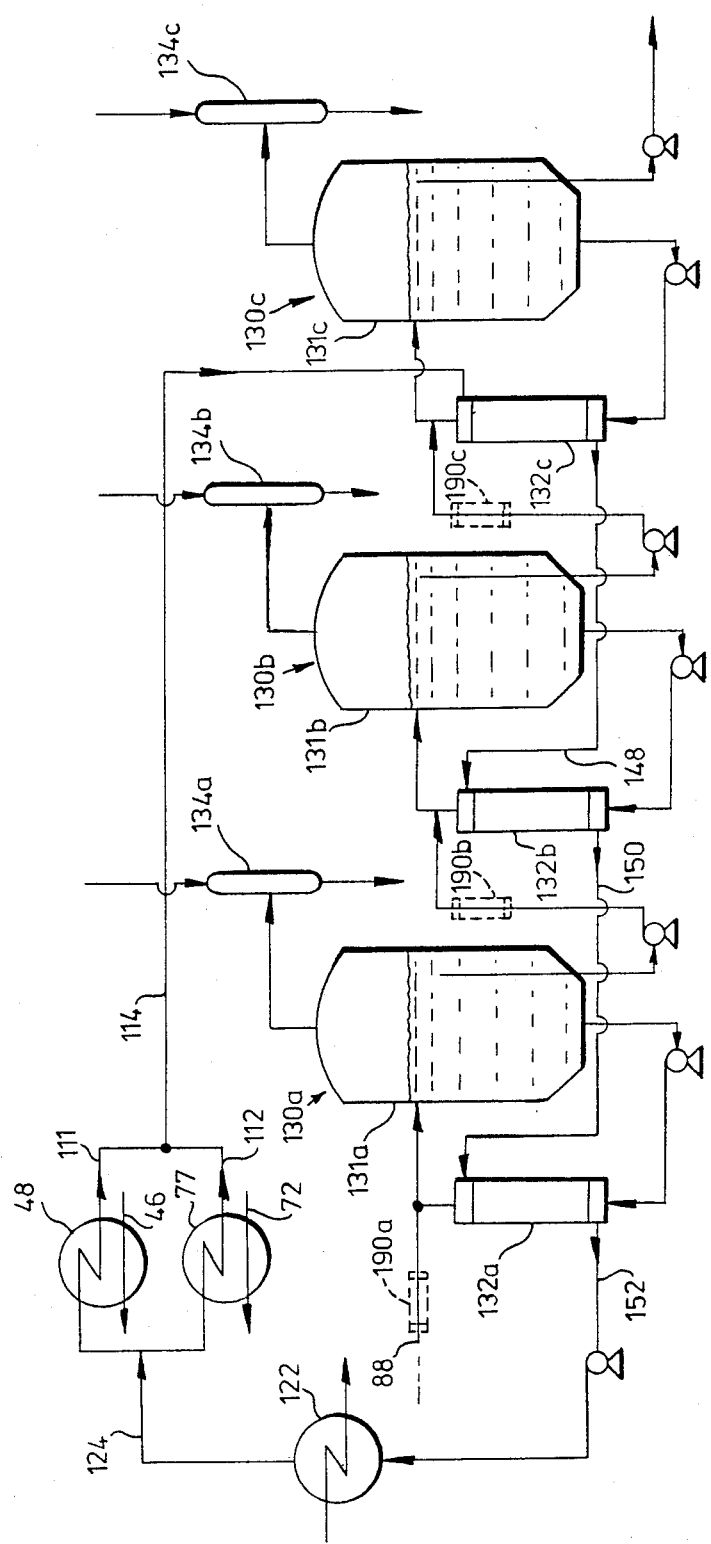
FIG. 3 shows another embodiment of a process according to the invention.

In this example, shown in FIG. 3, 700 STPD of phosphoric acid is concentrated from 28% to 54% phosphoric acid in three evaporator stages 130a, 130b, and 130c having evaporator vessels 131a, 131b, and 131c. A closed water loop is installed so that all three evaporator heaters 132a, 132b and 132c are operated on hot water in series flow. The total heat load for these heaters is supplied by the dry tower cooler 77 and intermediate absorber cooler 48 of the sulphuric acid plant 6. All three evaporator stages have barometric condensors 134a, 134b, 134c.

As shown in FIG. 3, the same demineralized and deaerated heated water 114 is used as shown in FIG. 2. Water stream 114 enters the third stage evaporator heater 132c first at 220° F., since again the temperature must be hottest in evaporator 120c. The water stream, now indicated at 148, leaves heater 132c at 200° F. after having given up heat to the circulating phosphoric acid therein. The water stream 148 at 200° F. next enters the second evaporator heater 132b and leaves that heater at the lower temperature of 180° F., as stream 150. Stream 150 passes into evaporator heater 132a and leaves as stream 152 at a temperature of 160° F. From here the water is pumped through the trim cooler 122 which removes any excess heat prior to returning to the $H_2SO_4$ plant.

Again, the operating conditions of evaporators 130a, 130b, are changed. Both evaporators are set to operate at reduced pressure, typically about 3 inches of mercury absolute. This change lowers the boiling temperature of the phosphoric acid in each of these evaporator stages, thereby increasing the thermal performance of their heaters. The operating condition of evaporators 130c is unchanged.

Table VI summarizes the operating conditions for the three stage evaporation of 700 STPD phosphoric acid being concentrated from 28% to 54%, using the hot water loop in all three evaporator heaters.

TABLE VI

|  | Evaporator Stage 130a | Evaporator Stage 130b | Evaporator Stage 130c |
|---|---|---|---|
| Feed strength (% phosphoric acid as $P_2O_5$) | 28% | 33.4% | 41.3% |
| Feed rate, lb/hr | 209,000 | 175,333 | 141,667 |
| Discharge rate, lb/hr | 175,333 | 141,667 | 108,000 |
| Water evaporated, lb/hr | 33,667 | 33,667 | 33,667 |
| Steam pressure, psia | — | — | — |
| Steam temp., °F. | — | — | — |
| Liquid temp., °F. | 138 | 156 | 190 |
| Vapour pressure, in. Hg. abs. | 3.0 | 3.0 | 2.5 |
| Steam rate, lb/hr | — | — | — |
| Barometric water at 92° F. USGPM | 3,937 | 3,937 | 3,937 |

FIG. 4 is a schematic drawing of a typical barometric condenser 100a which is used in the phosphoric acid processes shown in FIGS. 1 to 3. The condenser includes a body 160 which opens to the evaporator vessel via conduit 162. Cooling water is pumped into the top of the condenser body 160 via conduit 164 and leaves at a higher temperature via conduit 166. A steam ejector 168 is connected at 170 to the condenser body 160 to remove non-condensable inerts such as nitrogen, argon, oxygen and carbon dioxide.

By operating at a higher vacuum, a very substantial amount of additional water is required for the barometric condensers. For example in a 700 STPD phosphoric acid plant as described in example 2, using steam in the evaporators, the first stage evaporator 130a would normally operate at 6.5 to 7 inches of mercury, the second stage evaporator 130b at 4.8 to 5.5 inches, and the third stage evaporator 130c at 2.0 to 3.2 inches. When the stages are operated at the lower absolute pressures indicated, approximately 250 horsepower additional pumping capacity is required. However, 250 horsepower represents about 600,000 BTU per hour, which is much less than the energy saving of about $120 \times 10^6$ BTU per hour. In other words, the excess horsepower required is a very small fraction of the high grade energy which has been conserved.

The steam ejectors 168 used in the condensers still require steam, but only about 600 pounds per hour, a negligible fraction of the steam produced.

In the result, in the examples illustrated, and where low grade heat from the sulphuric acid stream coolers is used in the phosphoric acid plant evaporators, a saving is produced of between ½ and ¾ of the high grade energy produced by the sulphuric acid plant. In the example illustrated the saving is about $120 \times 10^6$ BTU per hour, which if used to generate electricity at 75% efficiency would produce about 4 megawatts of electrical power. In addition, since a full condensing turbine to drive the blower can now be used instead of a back pressure turbine (since large quantities of 25 to 50 pound steam are no longer needed), the efficiency of the power generation can be increased to 80% or more, and the capital cost is of course less than that required for two turbines, one operating from 600 pounds to 50 pounds and the other operating from 50 pounds to atmospheric pressure. The energy saved can also be used for other purposes, such as space heating and air conditioning.

When equal amounts of water are removed in more than one evaporator vessel at the same pressure, as is the case for evaporator vessels 131a, 131b of FIG. 3 (example 2), then certain elements of the evaporators can be made common. Specifically, in a phosphoric acid plant, each evaporator commonly contains a scrubber to remove undesirable products such as fluorsilicic acid (to prevent such products from entering the barometric condenser water stream) and an impingement plate before the scrubber. As shown in FIG. 5, the ducts 180a, 180b from the tops of the separator vessels 131a, 131b can be directed into a common duct 182 containing an impingement plate 184 and a scrubber 186. From scrubber 186, the common duct 182 is directed to a common barometric condenser 188. Although the evaporators 130a, 130b are arranged in series, the vacuum elements are thus commoned, reducing cost. (Normally when evaporators are arranged in series, the first stage evaporator is operated at a higher pressure than the second, to reduce separator vessel size and condenser requirements, but then the vacuum creating elements cannot be combined.)

If desired, and as shown in FIG. 6, a series-parallel arrangement of evaporators cna be used. FIG. 6 shows essentially the same arrangement as FIG. 3, with evaporator 130a feeding evaporator 130b, but evaporator 130c has now been divided into two parallel evaporators 130c-1 and 130c-2, each of which receives half the phosphoric acid feed stream form evaporator 130b. The hot water stream 114 will now be divided into two parallel streams, each of which passes through the heater of one of the evaporators 130c-1 and 130c-2, and which then rejoin to pass through the heaters of evaporator 130b and then 130a.

If desired, the phosphoric acid feed streams 88 to the phosphoric acid heaters 98a, 98b can be preheated by waste heat from the sulphuric acid plant, for example by hot water supplied from the final absorber cooler 62, as a means of supplementing the heating in the evaporator heaters. This arrangement is shown in dotted lines in FIG. 3, where series heating of the feed streams is indicated by heaters 190a, 190b, 190c. The heaters 170a, 170b, 170c are supplied with hot water from a stream 192 (FIG. 7), which after passing countercurrent to the acid in the final absorber acid cooler 62, is passed in series through the heaters 190c, 190b, 190a, countercurrent to the phosphoric acid therein. In this event, the heat from the final absorber cooler 62 can be substituted for that from the dry tower cooler 77 in the FIG. 3 arrangement if desired.

Although a particular sulphuric acid plant has been shown, other configurations can of course also be used, for example those shown in U.S. Pat. Nos. 3,443,896 and 3,475,120. In addition, if desired the sulphuric acid plant can be a metallurigical plant in which sulphide ores are roasted and release gases which include sulphur dioxide. In that case the usual gas preparation equipment, including scrubbers and precipitators, will be present, as will a drying tower to dry the $SO_2$ containing gases before they enter the converter. The boiler 22 will be omitted since the roaster gases do not contain sufficient energy for this purpose. The recovery of energy from the absorber coolers 48, 62 is the same as before. This eliminates the previous need to burn fuel specifically to generate steam for the evaporators of the phosphoric acid plant.

The embodiments of the invention in which an exclusive property or privilege is claimed are defined as follows:

1. In a process for the manufacture of concentrated phosphoric acid in which sulphuric acid and phosphate rock are reacted to produce a slurry of calcium sulphate in dilute phosphoric acid, the slurry being filtered to produce a dilute stream of phosphoric acid and the phosphoric acid then being concentrated by evaporation of excess water in at least first and second evaporator stages, and in which said sulphuric acid is produced in a sulphuric acid plant physically adjacent the phosphoric acid plant, said sulphuric acid plant having means for producing a stream of gas containing oxygen, means for reacting said stream of gas to produce sulphur dioxide therein, a converter to convert said sulphur dioxide to sulphur trioxide, drying means for absorbing, in a first portion of sulphuric acid, moisture from said gas stream upstream of said converter, absorbing means for absorbing in a second portion of sulphuric acid, sulphur trioxide from said converter, said first and second portions of sulphuric acid having temperatures in the range from approximately 180° F. to 230° F. before cooling, cooling means for cooling at least said second sulphuric acid portion, and means for producing high quality steam, the improvement comprising the steps of recovering in a heat recovery fluid heat from said cooling means, and using said heat as essentially the sole source of heat to evaporate water from the phosphoric acid in at least said first and second evaporator stages by flowing said heat recovery fluid first to said second evaporator stage and passing it in countercurrent flow with said phosphoric acid in a heat exchanger of said second evaporator stage to operate said second evaporator stage at a selected temperature, and then flowing said heat recovery fluid from said second evaporator stage to said first evaporator stage and passing it in countercurrent flow with said phosphoric acid in a heat exchanger of said first evaporator stage to operate said first evaporation stage at a temperature substantially lower than said selected temperature, maintaining the phosphoric acid in said first evaporator stage at a concentration which does not exceed approximately 40% $P_2O_5$, flowing phosphoric acid from said first evaporator stage to said second evaporator stage and maintaining the phosphoric acid in said second evaporator stage at a concentration which substantially exceeds that in said first evaporator stage operating said first evaporator stage at a very low pressure by a barometric condenser and operating said second evaporator stage at essentially the same very low pressure as said first evaporator stage to enable said evaporation, thereby allowing said steam to be used for other purposes.

2. The process of claim 1 wherein said cooling means cools both said first and second acid portions so that heat both from said absorber and said drying means is recovered in said heat recovery fluid.

3. The process of claim 1 wherein said heat from said heat recovery fluid is used to evaporate water from three said evaporator stages in said phosphoric acid plant, said three evaporator stages being arranged in series, and including the steps of flowing said heat recovery fluid first to the third evaporator stage and passing it in countercurrent flow with said phosphoric acid in a heat exchanger of said third evaporator stage, and then flowing said heat recovery fluid from said third evaporator stage to said second evaporator stage and passing it in countercurrent flow with said phosphoric acid in a heat exchanger of said second evaporator stage, and then flowing said heat recovery fluid from said second evaporator stage to said first evaporator stage and passing it in countercurrent flow with said phosphoric acid in a heat exchanger of said first evaporator stage and operating said third evaporator stage at low pressure by a barometric condenser and wherein said third evaporator stage is operated at essentially the same very low pressure as each of said first and second evaporator stages and at a temperature substantially higher than said selected temperature.

4. The process of claim 2 or 3 wherein substantially the same quantity of water per unit time at the same pressure is evaporated in said first evaporator stage as in said second evaporator stage.

5. The process of claim 2 or 3 wherein said converter has a plurality of catalyst beds and wherein said absorber is an intermediate absorber into which gas is directed from an intermediate one of said beds, said sulphuric acid plant also having a final absorber from which gas is directed from the last of said beds, the heat from at least said intermediate absorber being recovered in said heat recovery fluid.

6. The process of claim 2 or 3 wherein said barometric condensers are operated to provide a pressure in each of said evaporator stages not exceeding approximately three inches of mercury absolute.

7. The process of claim 3 wherein approximately the same quantity of water per unit time is evaporated in each of said three stages.

8. The process of claim 1 wherein the concentration of said phosphoric acid entering said first evaporator stage is approximately 28% $P_2O_5$ and said phosphoric acid is concentrated in said first evaporator stage to approximately 37% $P_2O_5$, and said phosphoric acid is then concentrated in said second evaporator stage from approximately 37% to 54% $P_2O_5$.

9. The process of claim 3 wherein the concentration of said phosphoric acid entering said first evaporator stage is approximately 28% $P_2O_5$ and said phosphoric acid is concentrated in said first evaporator stage from approximately 28% to approximately 33.4% $P_2O_5$, and then in said second evaporator stage from approximately 33.4% to 41.3% $P_2O_5$, and in said third evaporator stage from approximately 41.3% to 54% $P_2O_5$.

10. In apparatus for the production of concentrated phosphoric acid, said apparatus comprising:

(a) a sulphuric acid plant having means for producing a stream of gas containing oxygen, means for reacting said gas to produce sulphur dioxide therein, a converter to convert said sulphur dioxide to sulphur trioxide, drying means for absorbing in a first portion of sulphuric acid moisture from said gas stream upstream of said converter, absorbing means for absorbing in a second portion of sulphuric acid sulphur trioxide from said converter, said first and second portions of sulphuric acid having temperatures in the range from approximately 180° F. to 230° F. before cooling, cooling means for cooling at least said second sulphuric acid portion, and means for producing high quality steam, (b) a phosphoric acid plant having means connected to said sulphuric acid plant for receiving sulphuric acid therefrom, means for reacting such sulphuric acid with phosphate rock to produce a slurry of calcium sulphate in dilute phosphoric acid, and at least first and second evaporator stages for concentrating said dilute phosphoric acid by evaporating excess water therefrom, said first and second evaporator stages comprising first and second evaporator vessels respectively, the improvement wherein said first and second evaporator stages are arranged in series and including (c) a heat recovery loop comprising a heat recovery fluid, and means for circulating said heat recovery fluid through said cooling means to recover heat therefrom, (d) heat exchange means for transferring said heat to the phosphoric acid in said first and second evaporator stages, said heat exchange means including means for circulating said heat recovery fluid first in countercurrent flow with said phosphoric acid in said second evaporator stage for operating said second evaporator stage at a first selected temperature and then in countercurrent flow with said phosphoric acid in said first evaporator stage for operating said first evaporator stage at a temperature substantially lower than said selected temperature, (e) and barometric condenser means arranged to operate said first and second evaporator stages each at essentially the same pressure, said pressure not exceeding substantially three inches of mercury, to enable evaporation therein, said first and second evaporator vessels being of substantially the same volume, said barometric condenser means being a single barometric condenser connected to both said first and second evaporator vessels to draw water vapour from both said vessels, (f) said heat recovery fluid constituting essentially the sole source of heat for said evaporator stages.

11. Apparatus according to claim 10 including a single common scrubber connected between said evaporator vessels and said barometric condenser to scrub vapour from both said vessels.

* * * * *